Feb. 9, 1960  W. T. RENTSCHLER  2,924,161
PHOTOGRAPHIC CAMERA
Filed Sept. 26, 1956  2 Sheets-Sheet 1
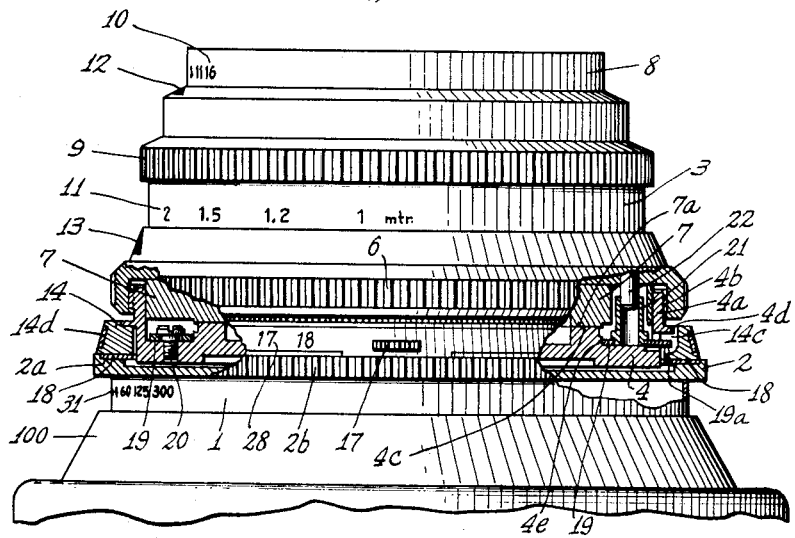
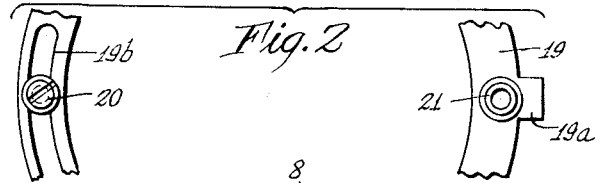
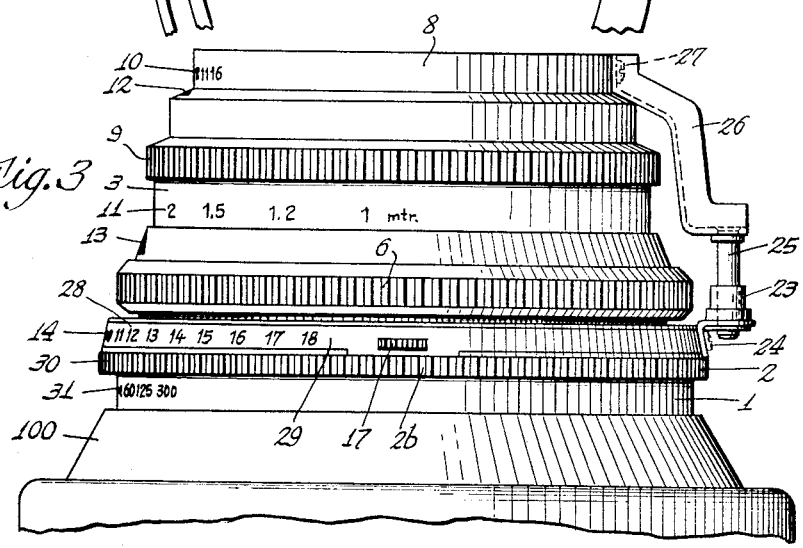
INVENTOR.
Waldemar T. Rentschler
BY
Munn, Liddy, Nathanson & March
ATTORNEYS Feb. 9, 1960  W. T. RENTSCHLER  2,924,161
PHOTOGRAPHIC CAMERA
Filed Sept. 26, 1956  2 Sheets-Sheet 2
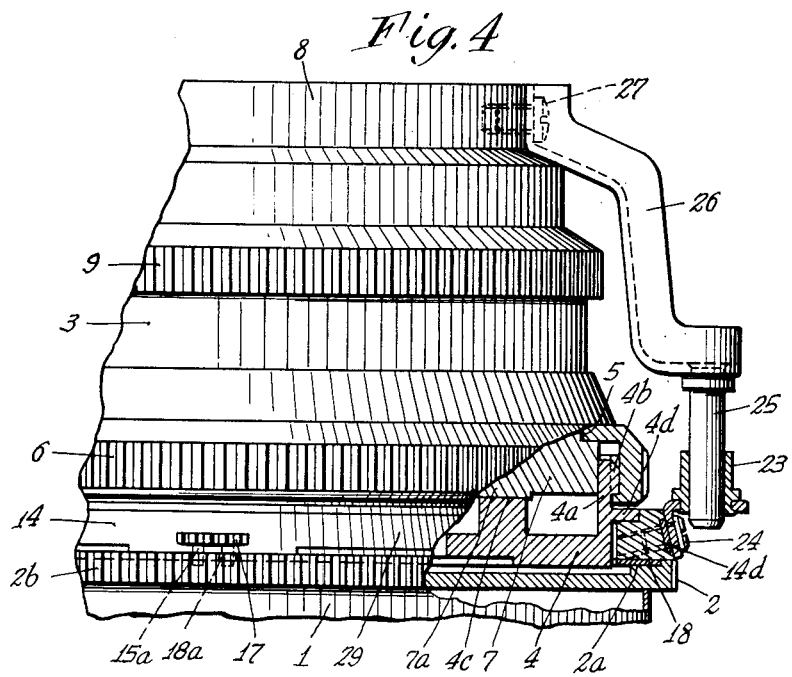
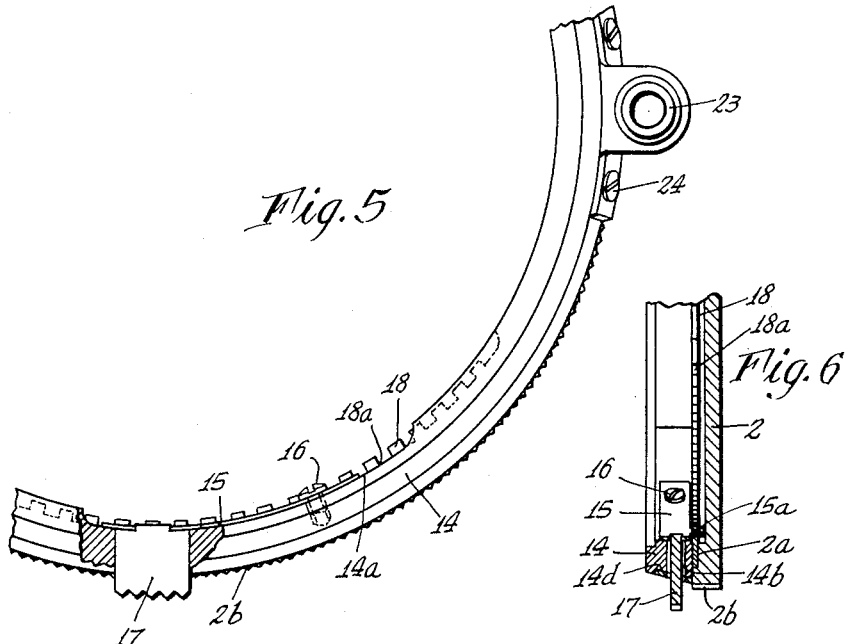
INVENTOR.
Waldemar T. Rentschler
BY
Munn, Liddy, Nathanson & March
ATTORNEYS

United States Patent Office

2,924,161
PHOTOGRAPHIC CAMERA

Waldemar T. Rentschler, Calmbach (Enz), Germany, assignor to Alfred Gauthier G.m.b.H., Calmbach (Enz), Germany, a corporation of Germany Application September 26, 1956, Serial No. 612,189

Claims priority, application Germany December 17, 1955

14 Claims. (Cl. 95—64)

This invention relates to photographic cameras having intra-lens shutters provided with interchangeable lenses arranged in front of the shutter blades, and more particularly to such shutter and lens structures wherein concurrent setting of the diaphragm setting mechanism and exposure-time setting are effected.

In the past there have been proposed various devices for coupling the exposure-time setting ring of a photographic camera and intra-lens shutter with the diaphragm setting mechanism of interchangeable lenses. With some of these devices, however, certain conditions must be fulfilled as to the inner structure of the shutter. Often, space is cramped and restricted, giving rise to difficult problems where the members of the coupling device are to be arranged in the shutter interior. With other devices of this type, it is necessary after exchanging the lenses, to adjust anew the time-diaphragm proportion. This necessitates special and additional attention on the part of the operator, as well as being unnecessarily time consuming.

The purpose of the present invention is to provide in a photographic camera with intra-lens shutter as above set forth, a novel and improved coupling device between the setting members for the diaphragm and exposure time, by which there is had great simplicity and saving of space, and by which there is eliminated special arrangements and constructions at the interior of the shutter.

Another object of the invention is to provide an improved shutter and lens structure in conjunction with a coupling device as above outlined, wherein the operation of such device is reliable, effective and foolproof at all times, and simple to understand and to operate.

Yet another object of the invention is to provide an improved shutter, lens and coupling device as above characterized, wherein interchanging of the lenses does not require any resetting of the scales, after they have been first correctly set for an exposure.

In accordance with this invention, these objects are accomplished by the provision of a concentric transmission ring disposed about the shutter axis such ring being connected on the one hand with the exposure-time setting ring by a releasable and adjustable device, and being releasably coupled on the other hand with a member of the diaphragm setting mechanism of the lens assembly. The said releasable coupling is constituted as a direct drive, for maximum efficiency and reliability, which is operative at all times that the interchangeable lens is carried on the shutter structure or camera.

More specifically, the invention may be carried out in various ways. One advantageous arrangement of the transmission ring and the exposure-time setting ring, by which the structure of the time setting ring need not be greatly modified, and additional ring may be provided, possessing on its inner circumference notches cooperable with a connection member of the transmission ring, such additional ring being in turn secured to the exposure-time setting ring.

Without requiring additional space, the said additional notched ring may be arranged at an inner shoulder of the exposure-time setting ring, for example.

Further, in carrying out the invention in a manner to save space and maintain a closed external appearance of the shutter structure, the connection member cooperable with the notched ring may be disposed at the inner circumference of the transmission ring and may be actuated from the exterior of the shutter structure by a handle member passing through the transmission ring in a radial direction.

A simple means for maintaining the connection member in engagement with the notched ring is by the use of a leaf spring, wherein such spring itself constitutes the said connection member and also carries the handle by which the connection is engaged and disengaged.

Moreover, in accordance with the invention, a releasable coupling may be provided between the diaphragm setting ring and the transmission ring which is independent of the structure of the latter, by the provision of yet another ring carrying a bushing for receiving a pin or equivalent part of the lens assembly, such additional ring having a direct connection and being rigid with the transmission ring.

For preserving a closed exterior appearance of the shutter structure, the pin which is received in said bushing may be carried at the interior of the lens assembly, on a suitable ring or disk usually provided therein.

In another embodiment of the invention there is provided a bushing for receiving a pin, said bushing and pin constituting the releasable coupling between the transmission ring and the diaphragm setting ring, in an arrangement by which the bushing and pin are disposed exteriorly of the transmission ring and the lens assembly. Where the diameter of the diaphragm setting ring is smaller than that of the transmission ring, the said pin for engaging the bushing is carried on a bent bracket or arm, to compensate for the different dimensions.

To facilitate setting of the diaphragm and exposure-time proportion, the said transmission ring may be provided with an exposure value scale which is cooperable with an index carried at the circumference of the exposure-time setting ring. Said index mark may advantageously serve at the same time in cooperation with a fixed exposure time scale carried by the shutter housing. The scale mounted on the transmission ring may advantageously be constituted of a metal band fixed to the circumference of said ring.

Other features and advantages will hereinafter appear.

In the drawings accompanying this specification, similar characters of reference indicate corresponding parts wherever possible in the several views, in which two embodiments of the invention are illustrated.

Figure 1 is a view partly in side elevation and partly in vertical or axial cross section of a photographic intra-lens shutter structure made in accordance with the invention and attached to a camera, said shutter structure being of the type adapted to accommodate interchangeable lenses and having the improved coupling means of the invention, interconnecting the diaphragm and exposure-time setting members.

Figure 2 is a fragmentary top view of a portion of a supporting and coupling device for use with the diaphragm setting mechanism.

Figure 3 is a side elevational view of a photographic intra-lens shutter structure mounted on a camera and adapted to accommodate interchangeable lenses, illustrating a modification of the invention wherein a different coupling device is provided between the diaphragm and exposure-time setting members.

Figure 4 is an enlarged fragmentary view partly in elevation and partly in cross section, of a portion of the shutter structure of Figure 3.

Figure 5 is a fragmentary top view, partially in cross section, showing a portion of the coupling device utilized in the structure of Figure 4.

Figure 6 is a transverse or vertical section taken through the assembly of Figure 5.

Referring first to Figures 1, 3 and 4 there is shown a housing 1 of a photographic intra-lens shutter, said shutter being mounted on a camera the front portion of which is indicated at 100. On the surface of the side walls of the shutter housing 1 there is disposed an exposure-time setting ring 2, which is turnable in a well known manner around the nozzle of a shutter base plate (not shown). The shutter structure shown in Figures 1, 3 and 4 also includes, in a well known manner, a plate 4 by which an interchangeable lens 3 may be releasably mounted.

In the present embodiments of the invention of the attaching of the interchangeable lens assembly 3 to the plate 4 is done by the usual screw thread joint, comprising a nozzle 4a carried by the plate 4 and having an external thread 4b. A threaded ring 6 carried in a groove 5 of the lens assembly 3 is threaded onto the nozzle 4a, the ring 6 and nozzle 4a constituting the said screw thread joint. The lens assembly 3, by a means well known, is keyed or secured against turning in the shutter structure, and details of such means are not illustrated since they form no part of the present invention.

The lens assembly 3 is guided by the inner cylindrical wall of the nozzle 4a, such assembly including the ring 7, as shown. The axial position of the lens assembly is determined by a raised portion or land 7a on the ring 7, engaging a shoulder 4c provided on the plate 4.

The lens assembly 3 further includes a diaphragm setting ring 8 and a distance setting ring 9, such rings carrying respectively adjusting scales 10 and 11 for diaphragm and focus values, said scales being cooperable with index marks 12 and 13 respectively on the lens assembly.

In the illustrated embodiments of the invention the structure of the lens assembly 3 is such that, when the distance setting ring 9 is actuated it does not disturb the rotative setting of the diaphragm setting ring 8. That is, the ring 8 remains motionless when setting the ring 9, except perhaps for a slight axial shifting movement.

In accordance with the present invention there is provided, arranged concentrically with respect to the shutter axis, a transmission ring 14 for the purpose of coupling the exposure-time setting ring to the diaphragm setting mechanism including the diaphragm setting ring 8. The transmission ring 14 is directly connected on the one hand to the exposure-time setting ring 2 and may be connected with a supporting device constituting part of a releasable coupling joined to the diaphragm setting ring 8, the arrangement being such that a positive drive is established between the rings 8 and 2 when the interchangeable lens assembly 3 is mounted in its operative position, as shown in Figures 1, 3 and 4.

In the specific embodiments of the invention illustrated herein the transmission ring 14 is held in place by a flange 4d of the lens supporting plate 4.

Over a portion of its inner circumference, the ring 14 is provided with a recess 14a, see Figure 5, in which there is disposed a latch member in the form of a leaf spring 15 secured in place by a screw 16. The spring 15 is thus supported against the inner circumference of the ring and carries at its free end an actuator member or handle 17 which extends radially outward through a guide slot 14b (Figure 6) provided in the transmission ring 14. For convenience of actuation, the outer edge or end of the handle 17 is knurled, as shown in Figure 5.

Also, in accordance with the invention, the latching spring 15 at its free end, adjacent or alongside of the handle 17, has jaws 15a adapted to cooperate with and be received in rectangular notches 18a provided on the inner circumference of a ring 18. The ring 18 is advantageously mounted in a recess 2a provided in the exposure-time setting ring 2, Figure 1, such recess being in the portion of the ring 2 which is closest to the transmission ring 14. Moreover, the ring 18 is rigidly connected with the exposure-time setting ring 2, in any suitable manner.

By the above structure there is provided a novel and advantageous direct-connection device for releasably connecting the transmission ring 14 to the exposure-time setting ring 2 in a reliable, simple and effective manner, through the use of the notched ring 18. Such connection means does not necessitate any appreciable additional space and has the additional advantage of incorporating a spring arranged at the interior of the transmission ring and operable from the exterior thereof. Furthermore, the said connection means is so constituted, in a simple manner, so as to be independent of the specific structure of the exposure-time setting ring 2, and to enable the camera exterior to have a closed appearance.

Referring now to Figure 1, there is provided a flat ring 19 adapted to constitute a portion of a coupling means for effecting simultaneous rotary movement of the diaphragm setting mechanism ring 8 and the transmission ring 14. The flat ring 19 rotatably engages a shoulder 4e on the lens attaching plate 4 and has a driving connection with the transmission ring 14, through the medium of a lug 19a, Figure 2, extending into a recess 14c in the transmission ring 14.

For holding the flat ring 19 in place, there is provided a screw 20 having a large head, said screw extending through a slot 19b (in the ring 19) having a length corresponding to the adjusting range of the transmission ring.

Furthermore, the invention provides a single-position keyed connection between the ring 19 and the diaphragm ring 8; in effecting this the flat ring 19 mounts a bushing 21, as by riveting, said bushing extending forwardly and parallel to the axis of the shutter structure. The interchangeable lens assembly 3 includes a cylindrical pin 22 which is adapted to be received in the bore of the bushing 21 at the time that the lens assembly is mounted on the shutter structure. The pin 22 is fixed, within the circumference of the lens assembly, to a ring or disk (not drawn) which is connected in a well known manner with the diaphragm actuation mechanism and the diaphragm setting ring 8.

The separable coupling means thus provided by the bushing 21 and pin 22 enables a positive drive to be effected between the exposure-time setting ring 2 and the diaphragm setting ring 8 while at the same time enabling the shutter structure to have a closed or unbroken appearance, with resultant advantages. Moreover, the said structure as above set forth is extremely simple and economical to fabricate, and is to a maximum degree independent of the structure of the transmission ring 14, through the use of the flat ring 19.

A second embodiment of the invention is illustrated in Figures 3, 4 and 5, wherein there is disclosed a different type of separable coupling or driving means associated with the diaphragm setting mechanism of the lens assembly. As shown, at the frusto-conical or tapered outer surface or mantle of the transmission ring 14 there is provided and affixed thereto a bushing 23, by means of a screw 24. The bushing 23 is adapted to receive a cylindrical pin 25 constituting a portion of the lens assembly 3, such pin being rigidly mounted on the diaphragm setting ring 8 by means of a bracket 26 affixed to the ring 8 by screws 27. With this structure there is provided a releasable coupling between the lens assembly 3 and the transmission ring 14. The structure of the said coupling involves relatively few, simple and economical-to-fabricate parts or components, and it does not place any special requirements upon the inner structure or arrangement of the lens assembly 3 nor the space between the lens assembly and the shutter proper. The arrangement of the pin 25 and arm or bracket 26 is especially adapted to constitute a releasable coupling wherever the diameter of the diaphragm setting ring 8 is smaller than the diameter of the transmission ring 14, as is herein illustrated.

When it is desired to set the time-diaphragm proportions to suit particular conditions of exposure, use is made of a well-known exposure value scale 28 provided on the ring 14 and adapted to be referred to an index mark 30 on the exposure-time setting ring 2. The scale 28 may be carried by a metal band 29 fixed in a recess 14d provided in the circumference of the transmission ring 14, as shown.

By providing the scale 28 on the separate metal band 29, the scale may be produced in accordance with well-known etching procedures, by which it is possible to produce various colorings of the figures of the scale, as well as the scale background. Thus the appearance of the scale may be greatly enhanced.

A camera and shutter structure constructed in accordance with the invention as above set forth, may be adjusted as to exposure values, in the following manner:

By means of an exposure meter, the erposure value corresponding to the prevailing light conditions and the sensibility of the particular film being used, is obtained. Then the connection between the transmission ring 14 and the exposure-time setting ring 2 is released, by depressing the actuating handle 17 (moving it radially inward), thereby effecting disengagement of the jaws 15a of the spring 15 from the notches 18a of the notched ring 18. Now, the transmission ring 14 and in conjunction therewith the diaphragm setting ring 8 are moved to bring the above obtained exposure value on the scale 28 opposite to the index mark 30 carried by the exposure-time setting ring 2. In effecting this, the exposure-time setting ring 2 may be shifted, as well as the transmission ring 14. Thereupon the handle 17 is released, so that the spring 15 with its jaws again engages the notches 18a of the ring 18, thereby coupling the rings 14 and 2 together.

The division of the notches 18 is made to correspond to the numbers of the scale 28, the scale 10 and the exposure-time scale 31. The exposure-time value on the scale 31 is read with reference to the index mark 30 on the ring 2, as already mentioned. Thus, the settings of exposure value and exposure time may be seen at a single glance. It will be understood that by the use of a well known detent device (not shown) the exposure-time setting ring 2 is conveniently held in any of the setting positions indicated by the scale 31.

After setting the exposure value as above outlined, an exposure-time diaphragm value suitable for the object which is to be photographed, is now selected by turning either the exposure-time setting ring 2 or the transmission ring 14, or the diaphragm setting ring 8, since all of said rings will move in unison. The limits of such movement are determined and indicated to the operator by the stops provided for the diaphragm setting ring 8 or exposure-time setting ring 2, as the case may be.

It is possible to arrange the various scales differently, as follows: The diaphragm scale 10 might be arranged for example at the circumference of the shutter housing 1, in which case an index mark would be provided on the transmission ring 14, for cooperation with such scale.

In accordance with the above structure a special advantage is obtained when successive pictures are taken with different lenses, all in connection with the same light conditions. For example, if the lens assembly 3 is removed and replaced by a second lens assembly, the exposure value adjusted at the transmission ring 14 will not change. Therefore, when mounting the second lens assembly it is only necessary, aside from insuring that the key device of the assembly is properly positioned, to make sure that either the pin 22 or the pin 25 of the releasable coupling will be properly engaged with the respective bushing 21 or 23. Therefore, the proper adjustment of the lens assembly is automatically effected, merely by the act of properly attaching such assembly to the shutter structure, and accordingly it is not necessary to readjust the scales where the light conditions remain the same. Thus the danger of misexposures due to the operator forgetting to readjust the scales, is eliminated.

In the same manner, the invention may be advantageously employed where interchangeable lenses ore mounted either on an intra-lens shutter directly connected with the front wall of the camera, or on a separate supporting device which by itself is directly connected to the front camera wall independently of the shutter structure. With the latter organization, instead of supporting the transmission ring 14 on the shutter structure as herein disclosed, said ring could be mounted on the said supporting device, or at the circumference of the shutter housing, and could be coupled with the exposure-time setting ring of the shutter.

Additionally, it should be understood that the specific structures illustrated and described above may be modified and arranged in different ways, without departing from the spirit of the invention. The particular structure employed may be adapted to special conditions of each different camera, or shutter structure, or lens assembly, to the end that a simple and effective coupling is secured, requiring a minimum amount of space.

It will be readily understood that the above advantages of the shutter structure of this invention, to wit, simplicity, small space requirements, and closed appearance of the camera structure, may be obtained with all different types of cameras having intra-lens shutters and interchangeable lenses therefor, arranged in front of the shutter blades.

Variations and modifications may be made within the scope of the claims, and portions of the improvements may be used without others.

I claim:

1. In a photographic camera of the type arranged to accommodate a number of interchangeable lens assemblies, said camera having a camera body and an intralens shutter housing carried by said body and having seprable-type mounting means by which interchangeable lens assemblies may be supported in front of the shutter blades, and said camera further having an exposure-time setting ring disposed on said shutter housing adjacent said mounting means and concentric with the shutter axis, a transmission ring carried by said shutter housing adjacent the exposure-time setting ring and in front of the latter, said transmission ring being turnable and disposed concentrically about the shutter axis; means comprising a direct driving connection disposed at the exterior of the shutter housing and camera body, releasably connecting said transmission ring to the exposure-time setting ring for concurrent and equal turning movement therewith; and coupling means for effecting rotary movement, said means being movable with said transmission ring and including a releasable coupling part adapted to coact with a mating coupling part connected with the diaphragm setting ring of an interchangeable and removable lens assembly for making a single-position keyed connection thereto to effect a rotary drive therewith by which the diaphragm setting ring of said assembly may be made to move simultaneously with movement of the transmission ring and exposure-time setting ring; and scale means associated with said transmission and exposure-time setting rings, to provide an indication of different relative positions of said rings.

2. The invention as defined in claim 1, in which the transmission ring is disposed in front of the exposure-time setting ring and is rotatably carried by the said mounting means for the lens assembly.

3. The invention as defined in claim 2 in which there is a ring having a notched inner periphery disposed on the shutter housing, said notched ring being rigid and concentric with the exposure-time setting ring and constituting a part of said releasable connecting means, and in which said connecting means further includes a latch member mounted on the transmission ring, cooperable with the inner periphery of the said notched ring.

4. The invention as defined in claim 3 in which the exposure-time setting ring has an inner shoulder which is engaged by the said notched ring.

5. The invention as defined in claim 3 in which the latch member is disposed at the inner circumference of the transmission ring and has an actuating handle passing through said ring in a radial direction.

6. The invention as defined in claim 3 in which there is a spring means for keeping the latch member engaged with the notched ring.

7. The invention as defined in claim 6 in which the said spring constitutes the latch member and has jaws cooperating with the notched ring.

8. The invention as defined in claim 1 in which there is a separate ring fixed to the transmission ring and carrying said coupling part, said part having a bore and comprising a bushing for receiving the mating part of the lens assembly.

9. The invention as defined in claim 8 in which there is a lens assembly carried by said mounting means, having a pin constituting the said mating part, said pin being disposed within the circumference of the lens assembly.

10. The invention as defined in claim 1 in which the coupling part comprises a bushing secured to the exterior of the transmission ring, in which there is a lens assembly carried by said mounting means, and in which the said mating part comprises a pin connected with the diaphragm setting ring of the lens assembly.

11. The invention as defined in claim 10 in which there is a bent arm mounting the said pin on the diaphragm setting ring of the lens assembly.

12. The invention as defined in claim 1 in which the said scale means comprises an exposure value scale on the transmission ring, and an index mark cooperable with said scale and carried by the exposure-time setting ring.

13. The invention as defined in claim 12 in which the exposure value scale is carried by a metal band fixed to the transmission ring.

14. The invention as defined in claim 12 in which there is an exposure time scale fixed with respect to the shutter housing and cooperable with the said index mark.

References Cited in the file of this patent

UNITED STATES PATENTS

| | | |
|---|---|---|
| 2,053,089 | Kuppenbender | Sept. 1, 1936 |
| 2,184,018 | Ort | Dec. 19, 1939 |
| 2,343,257 | Hineline | Mar. 7, 1944 |
| 2,596,328 | Dorsey | May 13, 1952 |

FOREIGN PATENTS

| | | |
|---|---|---|
| 1,114,903 | France | Dec. 26, 1955 |
| 1,126,831 | France | July 30, 1956 |